(12) United States Patent
Medved et al.

(10) Patent No.: US 6,751,188 B1
(45) Date of Patent: Jun. 15, 2004

(54) METHOD AND APPARATUS FOR A GRACEFUL CONTROLLER SWITCHOVER

(75) Inventors: Jan Medved, Pleasanton, CA (US); Snehal Karia, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/550,731

(22) Filed: Apr. 17, 2000

(51) Int. Cl.[7] .............................. H04J 1/16; H04L 12/42
(52) U.S. Cl. ..................... 370/216; 370/244; 370/450
(58) Field of Search ................................ 370/230, 231, 370/218, 216, 412, 248, 241, 503, 509, 450, 217, 401, 400, 244; 711/162; 714/6, 48; 709/209

(56) References Cited

U.S. PATENT DOCUMENTS

| | | | |
|---|---|---|---|
| 5,720,029 A | * | 2/1998 | Kern et al. ............. 395/182.18 |
| 6,170,044 B1 | * | 1/2001 | McLaughlin et al. ....... 711/162 |
| 6,272,386 B1 | * | 8/2001 | McLaughlin et al. ......... 700/82 |
| 6,335,937 B1 | * | 1/2002 | Chao et al. ................. 370/426 |
| 6,460,149 B1 | * | 10/2002 | Rowlands et al. ............ 714/43 |
| 6,490,245 B2 | * | 12/2002 | Burns et al. ................. 370/216 |

OTHER PUBLICATIONS

ITU–T Recommendation Q.2110, B–*ISDN –ATM Adaptation Layer –Service Specific Connection Oriented Protocol* (SSCOP), pp. i–95, (Jul. 1994).

ITU–T Recommendation Q.2130, B–ISDN signaling ATM Adaptation Layer –Service Specific Coordination Function for Support of Signaling at the User–to–Network Interface (SSFC at UNI), pp. i–54 (Jul. 1994).

* cited by examiner

Primary Examiner—Duc Ho
(74) Attorney, Agent, or Firm—Blakely, Sokoloff, Taylor & Zafman LLP

(57) ABSTRACT

A method and apparatus for switching from a primary network controller to a secondary network controller. A switchover request is received. Messages accepted by the node from the peer nodes are limited. An active link is maintained between the node and peer nodes. Finally, control is transferred from the primary controller to the secondary controller.

22 Claims, 5 Drawing Sheets

METHOD AND APPARATUS FOR A GRACEFUL CONTROLLER SWITCHOVER

FIELD OF THE INVENTION

The present invention pertains to communications and networking. More particularly, the invention relates to the usage of resources in networking devices.

BACKGROUND OF THE INVENTION

FIG. 1A shows an example of a prior art wide-area networking system serviced by ATM (Asynchronous Transfer Mode). A wide-area network (WAN) link 120 interconnects a first network 100 with a second network 110. Each network has a plurality of nodes which may each contain switching devices that regulate data traffic to one or more user terminals. Network 100 is shown having nodes 102, 103, 104, 106, and 108, while network 110 is shown having nodes 112, 114, 116, and 118. A first user terminal 105 is connected to node 102 of network 100 and a second user terminal 115 is connected to node 118 of network 110. In order for user terminal 105 and user terminal 115 to communicate with each other, a call must first be established between them. This call may be switched through a plurality of nodes. One possible route for sending data from user terminal 105 to user terminal 115 is for data to go from node 102 to 106 to 108 and then across the WAN link to node 112 and node 118, finally reaching user terminal 115.

Each node has a controller device and switch which facilitate the calls through the node. The controller has processing, memory, and other resources to interpret, forward, and process messages and initiate other messages as appropriate, while the switch ordinarily handles the physical routing of messages among nodes and user terminals.

In a redundant high-availability private network-to-network interface ("PNNI") routing protocol implementation, a redundant pair of controllers is used in the case of controller failure. Thus, each node has two controllers, one primary and one secondary. In order to ensure the proper functioning of the secondary controller in case the primary controller fails, it is desirable to test the secondary controller by switching the primary controller to a standby state and the secondary controller to an active state. The switching of controllers is also desirable for performing maintenance on the primary controller.

A secondary controller follows the state of the primary controller with a slight delay—for example, a delay of one second. During a switchover, all activity must be transferred from the primary controller to the secondary controller. However, because of the delay between the controllers, synchronization of the controllers can not be guaranteed. A small delay such as this could cause destabilization of the network.

FIG. 1B shows an example of a prior art node configuration. When messages of any type are received at the node at a particular interface, they first pass through switch 150 and then are forwarded to the layer 2 function of secondary controller 160 or of primary controller 165 depending on which controller is active. The layer 2 function of controllers 160 and 165 is also referred to as SSCOP (Service-Specific Connection-Oriented Protocol, set forth in the ITU (International Telecommunication Union) specifications Q.2110 (B-ISDN ATM adaptation layer-service Specific Connection Oriented Protocol (SSCOP) 07/94) and Q.2130 (B-ISDN signaling ATM adaptation layer-Service Specific coordination function for support of signaling at the user network interface (SSFC At UNI) 07/94), which provides a reliable data link transport function to layer 3. The layer 3 function performs both signaling and call processing. Not shown is an intermediary buffer between layer 2 and layer 3 which is incorporated for sequencing and timing in some systems.

Because of the synchronization delay described above, SSCOP sessions may go down and communication with other nodes may be broken. When an SSCOP session goes down, ATM protocols require a status enquiry to be performed. The status enquiry resynchronizes all connections to the downed node with all its neighboring nodes. A node often has between 500,000 and 1,000,000 connections to resynchronize. If the synchronization does not occur quickly, all calls going to the downed node may be lost. It is desirable to avoid the status enquiry procedure because the procedure generates a flurry of status messages in the network—for example, if eight messages per connection are sent and the node maintains 100,000 connections, then 800,000 messages would be sent, which can cause a destabilization of the node.

For these reasons, switches have been typically operated on the same active primary card for extended periods of time. When the switchover is forced to occur, if a secondary controller is not operational, the primary controller has to be reset and the databases of the primary controller have to be rebuilt, causing hours of network outages.

SUMMARY OF THE INVENTION

What is disclosed is a method for switching from a primary network controller to a secondary network controller. A switchover request is received. Messages accepted by the node from the peer nodes are limited. An active link is maintained between the node and peer nodes. Finally, control is transferred from the primary controller to the secondary controller.

Other features and advantages of the present invention will be apparent from the accompanying drawings and from the detailed description that follows below.

BRIEF DESCRIPTION OF THE DRAWINGS

The present invention is illustrated by way of example and not limitations in the figures of the accompanying drawings, in which like references indicate similar elements, and in which.

DETAILED DESCRIPTION

What is disclosed is a method and apparatus for the graceful switchover of a primary network controller to a secondary network controller. The controllers interpret and process messages related to connection-oriented network data transported over interfaces connected to the controller. As will be discussed in greater detail below, an embodiment of the present invention allows a secondary controller to seamlessly take over control from a primary controller.

Figure 1A:
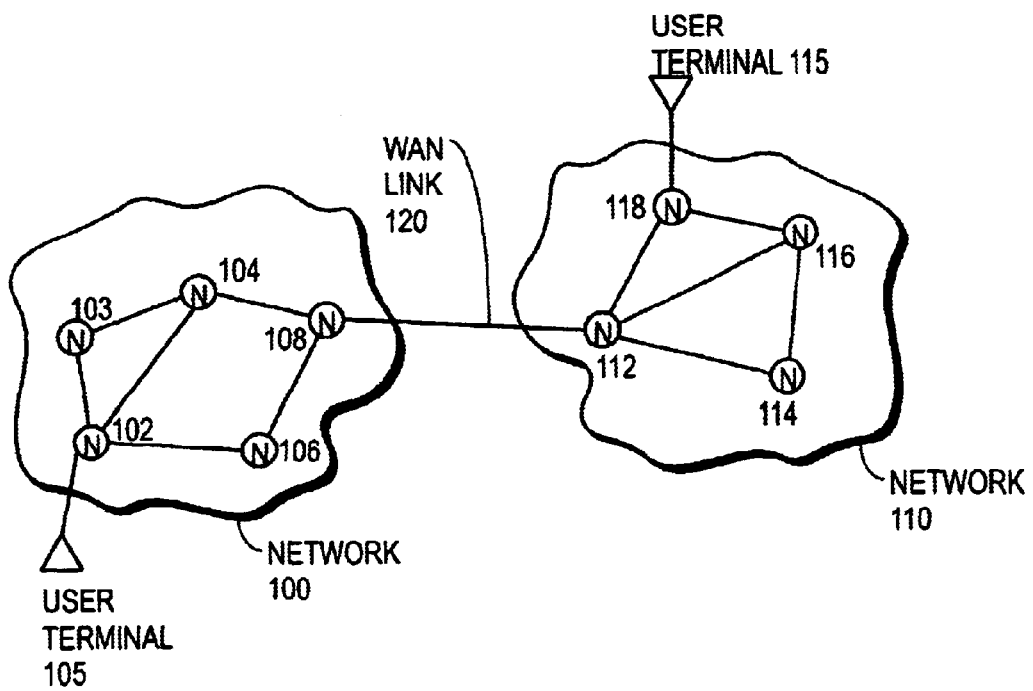
FIG. 1A shows a prior art networking topology.
Figure 1B:
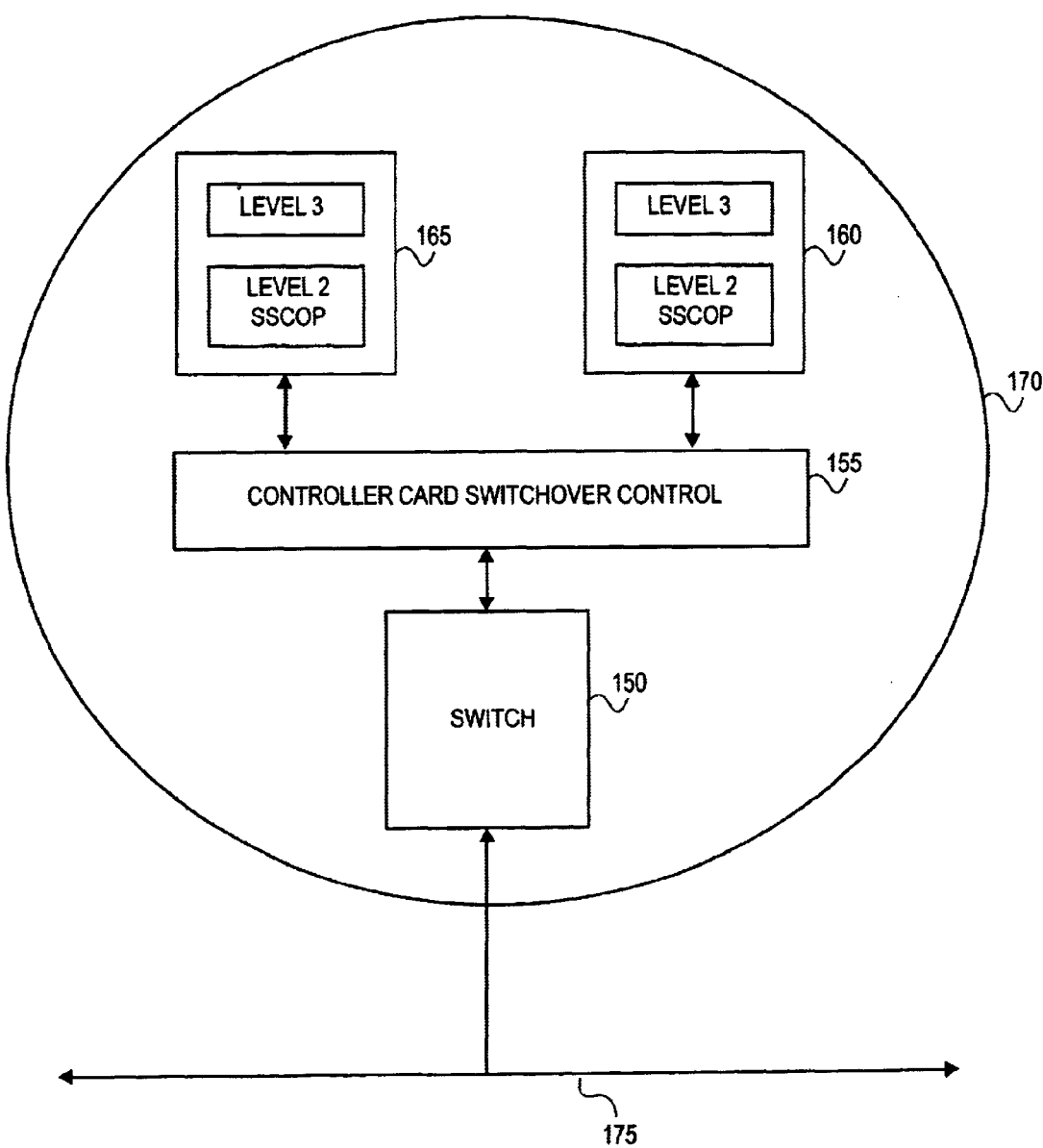
FIG. 1B shows a prior art configuration for a network node.
Figure 2:
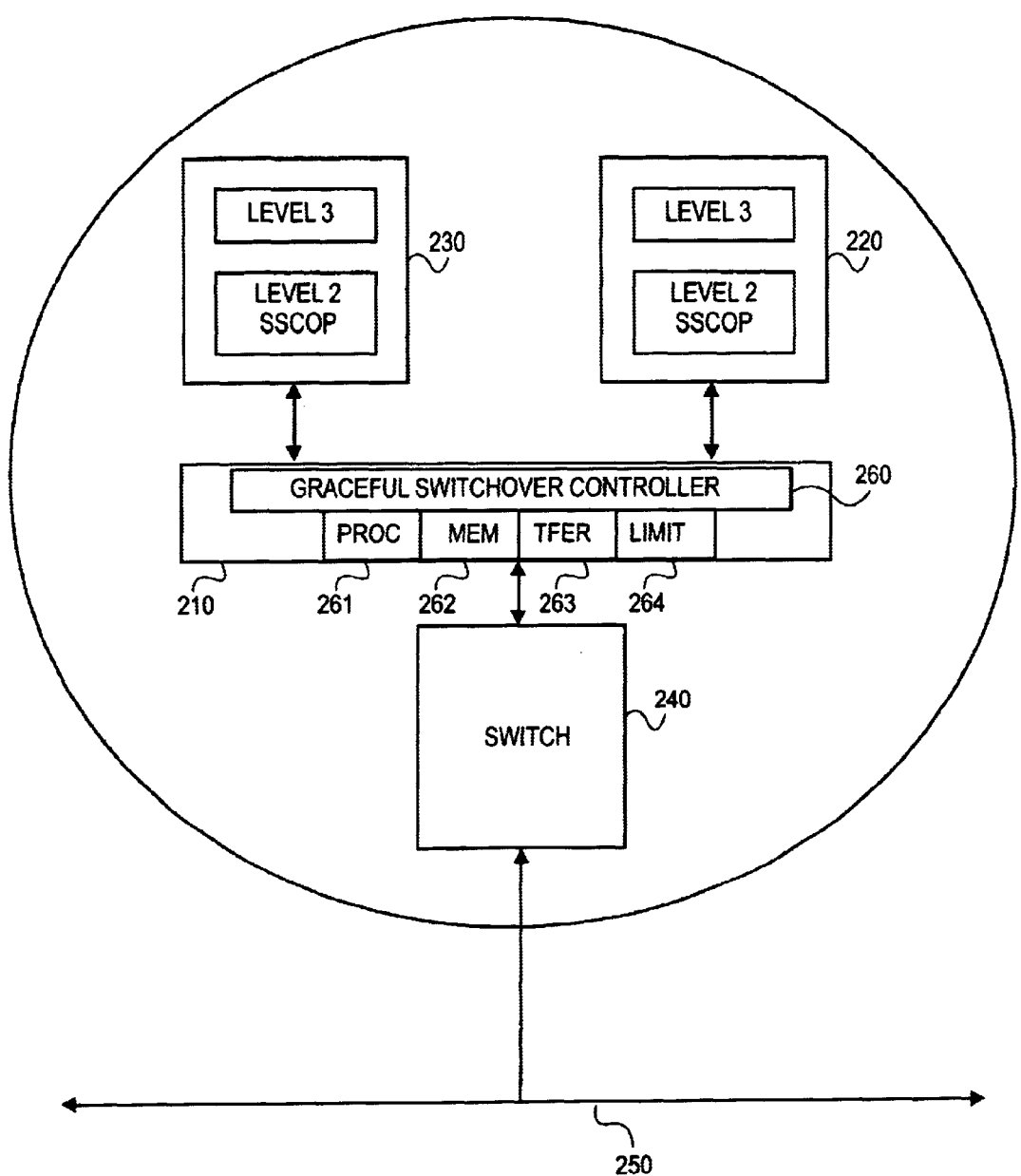
FIG. 2 shows a configuration for a network node using one embodiment of the present invention.

FIG. 2 shows a configuration for a network node using one embodiment of the present invention. When messages of any type are received at the node at a particular interface, they first pass through switch 240 and then are forwarded to the layer 2 function of secondary controller 220 or of primary controller 230 depending on which controller is active. The layer 2 function of controllers 220 and 230 is referred to as SSCOP (Service-Specific Connection-Oriented Protocol, set forth in the ITU (International Telecommunication Union) specifications Q.2110 (B-ISDN ATM adaptation layer-service Specific Connection Oriented Protocol (SSCOP) 07/94) and Q.2130 (B-ISDN signaling ATM adaptation layer-Service Specific coordination function for support of signaling at the user network interface (SSFC At UNI) 07/94), which provides a reliable data link transport function to layer 3. The layer 3 function performs both signaling and call processing. Not shown is an intermediary buffer between layer 2 and layer 3 which is incorporated for sequencing and timing in some systems.

Controller card switchover control 210 includes graceful switchover controller 260 which functions to avoid resetting SSCOP when a switchover occurs. By not resetting SSCOP the Status Enquiry procedure will not be initiated. Graceful Switchover controller 260 further includes a message limiter 264 adapted to reduce the number of messages accepted by the node and to maintain an active link with peer nodes. Transfer controller 263 of graceful switchover controller 260, transfers control from the primary controller 230 to the secondary controller 220. Processor 261 executes logic functions required by graceful switchover controller 260. Memory 262 stores instructions for processor 261. In another embodiment processor 261 and memory 262 are located within controller cards 220 and 230.

Although embodiments of the present invention have been described as having both software and hardware elements, alternative embodiments may be all hardware, all software, or a combination of each. Processor 261 may be a MIPS™ 4650 processor sold by MIPS Technologies, Inc., 1225 Charleston Road, Mountain View, Calif. For alternate embodiments, processor 261 could be another type of processor.

The software implementing the present invention can be stored in memory 262, a mass storage device (not shown), or other storage medium accessible to processor 261. This software may also be resident on an article of manufacture comprising a computer usable mass storage medium or propagated digital signal having computer readable program code embodied therein and being readable by the mass storage medium and for causing processor 262 to perform graceful controller card switchovers in accordance with the teachings herein.

Figure 3A:
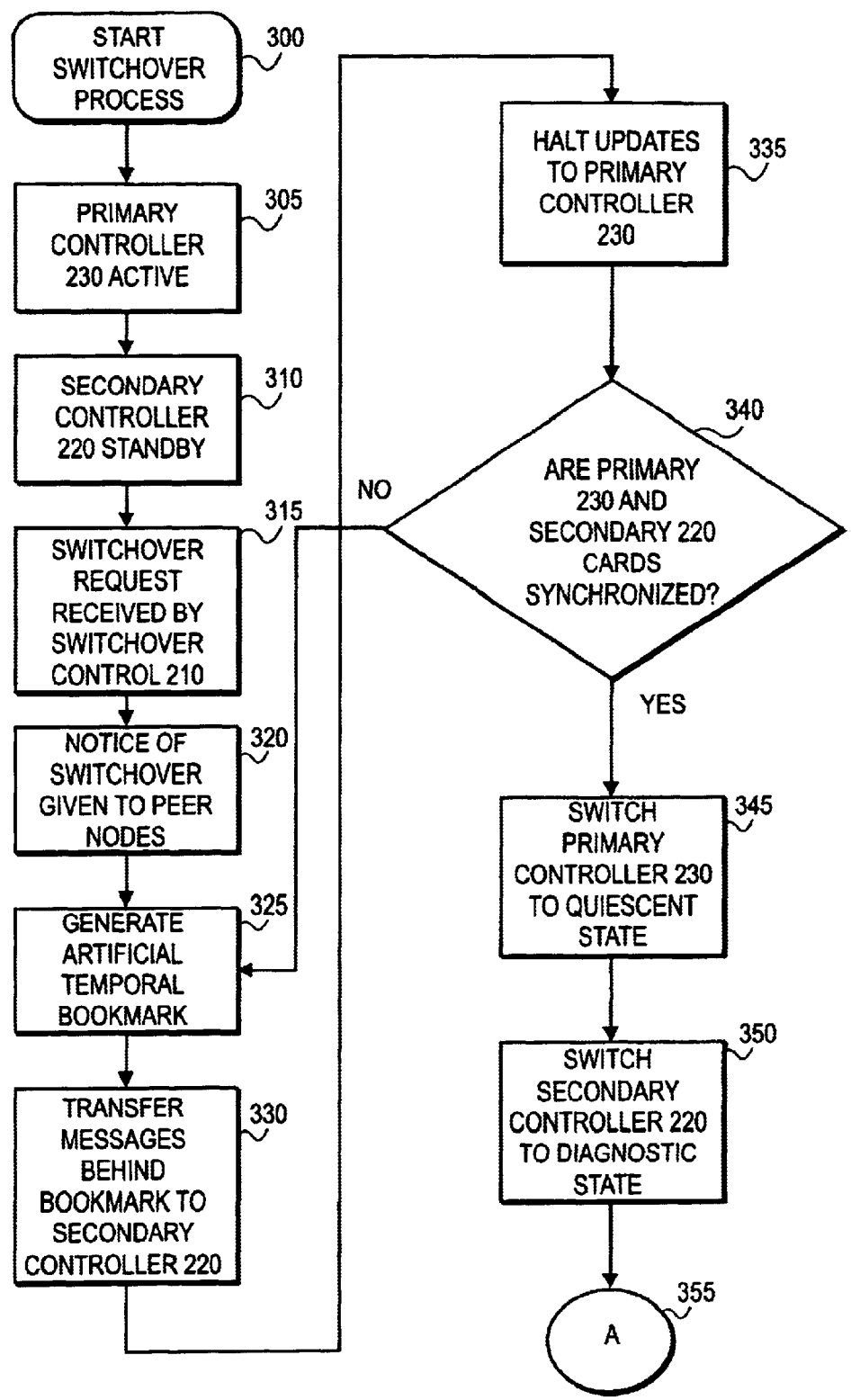
FIGS. 3A and 3B are flow charts illustrating the processing flow of one embodiment of the present invention.
Figure 3B:
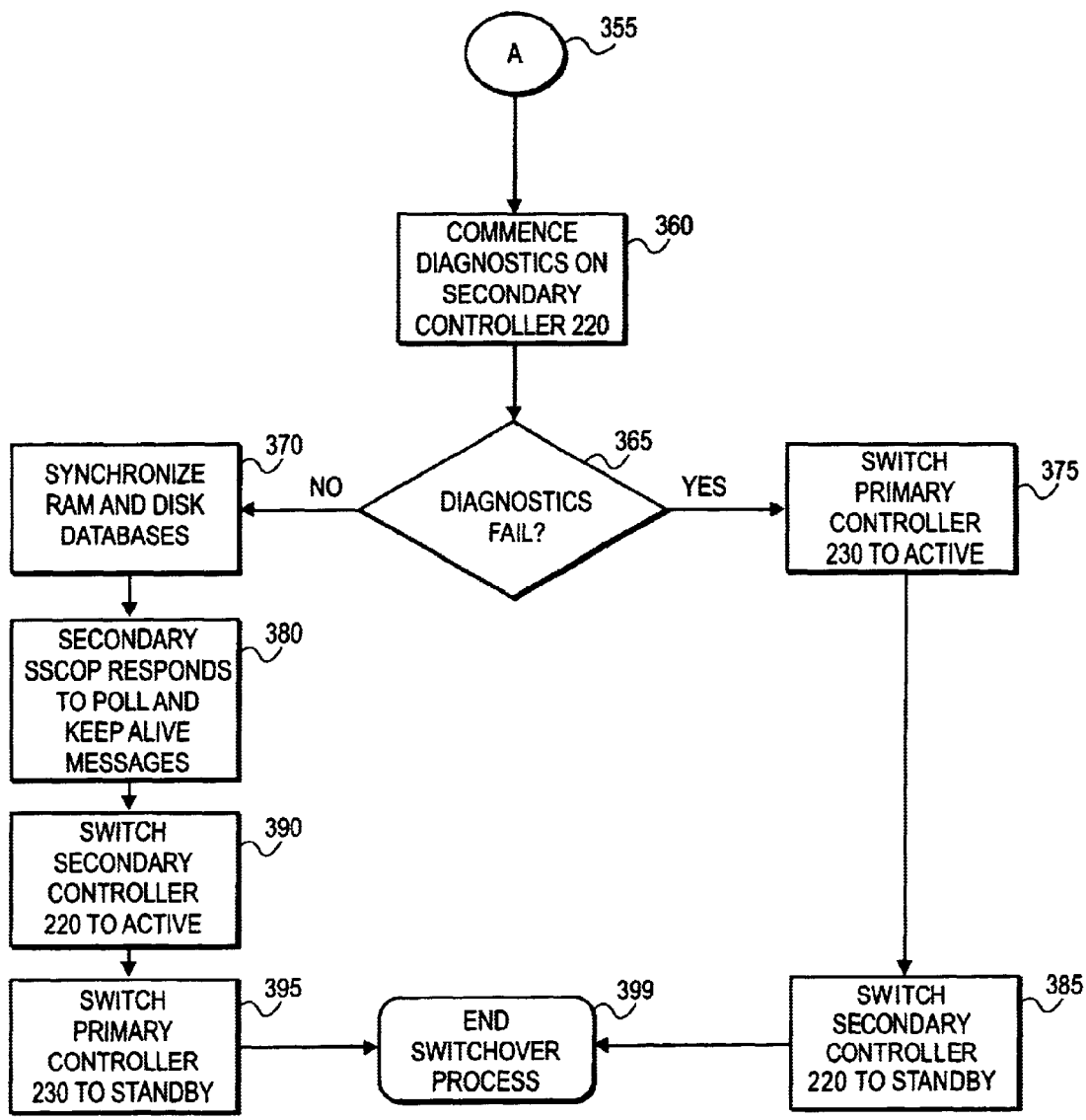

The logic utilized by graceful switchover controller is exemplified in FIGS. 3A and 3B as Switchover Process 300. Generally in one embodiment, the SSCOP reset can be avoided if call states and SSCOP states on the primary controller 230 and the secondary controller 220 can be resynchronized before the switchover. The call state consists of calls that are in progress. The SSCOP state consists of transmit and receive state variables known as sequence numbers.

The SSCOP protocol allows nodes to communicate with each other. In the current state of the art, the SSCOP has a windowing mechanism that can be used to control the flow of signaling messages. This flow control mechanism applies to all signaling messages regardless of content and thus regardless of their potential usage or effect on controller resources.

As shown in FIGS. 3A and 3B, the graceful switchover procedure commences at block 300. At processing block 305 the primary controller 230 is in an active state. The secondary controller 220 is in a standby state in processing block 310. A user initiated controller switchover request is received by switchover control 210 at processing block 315. In block 320, switchover control 210 provides notice of the switchover to surrounding peer nodes. At this stage, SSCOP closes its receive windows to all surrounding peer nodes and stops forwarding messages also. SSCOP will still respond to POLL and KEEP ALIVE messages. By responding to POLL and KEEP ALIVE messages SSCOP indicates to peer nodes that node 104 is still active on the network as further described below.

However, SSCOP effectively closes its receive window by indicating that the last received sequence number was the sequence number of the message last forwarded from SSCOP. SSCOP then will transfer the last processed sequence number to the SSCOP in secondary controller 220. More specifically, in response to a poll request from peer nodes SSCOP sends a status response acknowledging receipt of all messages from those peer nodes. A parameter indicating the last sequence number of the messages received is set to indicate that SSCOP is only willing to accept one additional message. The parameter is one greater than the window size. Retransmission of the one message maintains a live link between two SSCOPs. In all subsequent status responses, SSCOP responds with the same sequence number.

In processing block 325 an artificial temporal bookmark is created, marking a point in time where thereafter all messages from SSCOP in primary controller 230 are transferred to secondary controller 220 carried out in processing block 330. In processing block 335, call updates to the primary controller 230 are halted when a redundancy manager within the primary controller 230 transfers all outstanding active calls to the redundancy manager in the secondary controller 220.

In decision block 340, the switchover control 210 verifies that the primary controller 230 and secondary controller 220 are synchronized. If they are not synchronized, flow passes back to processing block 325. Two SSCOPs on any link must pass a POLL and KEEP ALIVE message to maintain synchronization periodically—for example every second. Each POLL will have a sequence number and the KEEP ALIVE messages will acknowledge the sequence number. While in the quiescent state, the primary controller 230 still responds to POLL and KEEP ALIVE requests messages.

In processing block 350, the secondary controller is switched to a diagnostic state in order to determine if the secondary card is fully functional. Processing continues from FIGS. 3A to 3B via bubble A. Now referring to FIG. 3B, diagnostics are performed in processing block 360. In decision block 365, if the diagnostics fail, control is passed onto processing block 375 where the primary controller 230 is switched to an active state again. Then SSCOP starts running again as if nothing happened.

In decision block 365, if the diagnostics show that the secondary controller 220 is fully functional, control is passed onto processing block 370 in which RAM and a disk database of primary controller 230 is synchronized with the RAM and disk database of secondary controller 220. SSCOP immediately begins responding to POLL and KEEP ALIVE messages. In processing block 340, the secondary controller 230 enters an active state at which time it frees all calls in progress and resumes normal call processing and all active calls are resynchronized. The primary controller 220 enters into a standby state in processing block 395. Finally in block 399, the switchover process completes.

A method and apparatus for a graceful controller switchover has been disclosed. An advantage provided by the present invention is to prevent SSCOP links from resetting during a controlled (i.e., non-graceful) switchover, resulting in greater availability of the node. Another advantage is to prevent the generation of millions of Status Enquiry messages which would otherwise result in degraded service. Yet another advantage is to alleviate node and network congestion caused by the millions of Status Enquiry messages. The present invention enables network administrators to run trial switchovers to insure that a secondary controller is fully functional in case an emergency switchover is required.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawing are, accordingly, to be regarded in an illustrative rather than a restrictive manner.

We claim:

1. In a node, a method for switching from a primary network controller to a secondary network controller comprising:

receiving a switchover request;

limiting messages accepted by the node from peer nodes, wherein the node includes the primary controller and secondary controller;

maintaining an active link between the node and peer nodes over which the node continues to receive the messages; and transferring control from the primary controller to the secondary controller.

2. The method of claim 1 wherein receiving a switchover request further comprises providing notice to the peer nodes of the switchover.

3. The method of claim 1 wherein limiting messages further comprises:

generating an artificial temporal bookmark; and receiving a single poll message from the peer node.

4. The method of claim 1 wherein maintaining an active link further comprises synchronizing the primary and secondary controllers.

5. The method of claim 1 further comprising redirecting messages from a primary controller queue to a secondary controller queue.

6. The method of claim 1 further comprising performing diagnostics on the secondary controller.

7. The method of claim 6 further comprising returning control to the primary controller if the diagnostics fail.

8. In a communication network node, an apparatus for switching control from a primary network controller to a secondary network controller comprising:

a message limiting mechanism adapted to reduce the number of messages accepted by the node, and adapted for maintaining an active link over which the node continues to receive messages from peer nodes, wherein the node includes the primary controller and the secondary controller; and a transfer mechanism coupled to the message limiting mechanism adapted to transfer control from the primary controller to the secondary controller.

9. An apparatus for switching from a primary network controller to a secondary network controller comprising:

means for receiving a switchover request;

means for limiting messages accepted by a node from peer nodes, wherein the node includes the primary controller and the secondary controller;

means for maintaining an active link between the node and peer nodes over which the node continues to receive messages; and means for transferring control from the primary controller to the secondary controller.

10. The apparatus of claim 9 wherein the receiving means further comprise means for providing notice to the peer nodes of the switchover.

11. The apparatus of claim 9 wherein the limiting means further comprises:

means for generating an artificial temporal bookmark; and means for receiving a single POLL message from the peer nodes.

12. The apparatus of claim 9 wherein the maintaining means further comprises means for synchronizing the primary and secondary controllers.

13. The apparatus of claim 9 further comprising means for redirecting messages from a primary controller queue to a secondary controller queue.

14. The apparatus of claim 9 further comprising means for performing diagnostics on the secondary controller.

15. The apparatus of claim 14 further comprising means for returning control to the primary controller if the diagnostics fail.

16. A computer readable medium having stored thereon a plurality of instructions for switching from a primary network controller to a secondary network controller, said plurality of instructions when executed by a computer, cause said computer to perform:

receiving a switchover request;

limiting messages accepted by a node from peer nodes, wherein the node includes the primary controller and the secondary controller;

maintaining an active link between the node and peer nodes over which the node continues to receive messages; and transferring control from the primary controller to the secondary controller.

17. The computer-readable medium of claim 16 having stored thereon additional instructions for receiving a switchover request, said additional instructions when executed by a computer, cause said computer to further perform providing notice to the peer nodes of the switchover.

18. The computer-readable medium of claim 16 having stored thereon additional instructions for limiting messages, said additional instructions when executed by a computer, cause said computer to further perform:

generating an artificial temporal bookmark; and receiving a single poll message from the peer nodes.

19. The computer-readable medium of claim 16 having stored thereon additional instructions for maintaining an active link, said additional instructions when executed by a computer, cause said computer to further perform synchronizing the primary and secondary controllers.

20. The computer-readable medium of claim 16 having stored thereon additional instructions, said additional instructions when executed by a computer, cause said computer to further perform redirecting messages from a primary controller queue to a secondary controller queue.

21. The computer-readable medium of claim 16 having stored thereon additional instructions, said additional instructions when executed by a computer, cause said computer to further perform, performing diagnostics on the secondary controller.

22. The computer-readable medium of claim 21 having stored thereon additional instructions, said additional instructions when executed by a computer, cause said computer to further perform returning control to the primary controller if the diagnostics fail.

* * * * *